US009253286B2

(12) United States Patent
Bell et al.

(10) Patent No.: US 9,253,286 B2
(45) Date of Patent: Feb. 2, 2016

(54) COMPUTER PROGRAM COMPOSED FROM TABULAR STORAGE STRUCTURES THAT INCLUDES DATA AND CODE

(76) Inventors: Blaine A. Bell, New York, NY (US); Steven K. Feiner, New York, NY (US)

( * ) Notice: Subject to any disclaimer, the term of this patent is extended or adjusted under 35 U.S.C. 154(b) by 235 days.

(21) Appl. No.: 13/567,728

(22) Filed: Aug. 6, 2012

(65) Prior Publication Data

US 2012/0317559 A1 Dec. 13, 2012

Related U.S. Application Data

(63) Continuation of application No. 12/791,380, filed on Jun. 1, 2010, now Pat. No. 8,260,850, and a continuation of application No. 11/697,564, filed on Apr. 6, 2007, now abandoned.

(60) Provisional application No. 60/841,582, filed on Aug. 30, 2006, provisional application No. 60/790,376, filed on Apr. 7, 2006.

(51) Int. Cl.
*G06F 15/16* (2006.01)
*H04L 29/08* (2006.01)
*G06F 9/54* (2006.01)

(52) U.S. Cl.
CPC ............... *H04L 67/34* (2013.01); *G06F 9/542* (2013.01)

(58) Field of Classification Search
CPC ................................ G06F 9/542; H04L 67/34
USPC .................................. 709/201, 203; 707/792
See application file for complete search history.

(56) References Cited

U.S. PATENT DOCUMENTS

| | | | | |
|---|---|---|---|---|
| 5,884,097 A | * | 3/1999 | Li et al. ........................ | 710/43 |
| 5,926,816 A | * | 7/1999 | Bauer et al. ................... | 1/1 |
| 6,202,070 B1 | * | 3/2001 | Nguyen et al. ................ | 1/1 |
| 6,463,584 B1 | * | 10/2002 | Gard et al. .................... | 717/171 |
| 7,200,651 B1 | * | 4/2007 | Niemi ........................... | 709/223 |
| 2003/0070163 A1 | * | 4/2003 | Kroesa et al. ................. | 717/171 |
| 2005/0262499 A1 | * | 11/2005 | Read ............................. | 717/172 |
| 2007/0052734 A1 | * | 3/2007 | Skinner et al. ................ | 345/689 |
| 2007/0260733 A1 | * | 11/2007 | Havemose et al. ........... | 709/226 |
| 2008/0163172 A1 | * | 7/2008 | Rossmann et al. ........... | 717/121 |
| 2009/0150878 A1 | * | 6/2009 | Pathak et al. ................. | 717/172 |
| 2015/0040104 A1 | * | 2/2015 | Mall et al. .................... | 717/121 |

OTHER PUBLICATIONS

Dan Weller and R. Williams, Graphic and relational data base support for problem solving. In *Proceedings of the 3rd Annual Conference on Computer Graphics and Interactive Techniques*, Philadelphia, Pennsylvania, 1976. pp. 183-189.

A.V. Aho, C. Berri, and J.D. Ullman, The theory of joins in relational databases, *ACM Trans. Database Syst.*, vol. 4, pp. 297-314, 1979.

(Continued)

*Primary Examiner* — Mohamed Wasel

(74) *Attorney, Agent, or Firm* — Patent Portfolio Builders PLLC

(57) ABSTRACT

A system and method of data programming involves a computer generating a tabular storage structure that includes data and code. The code is defined by a column of the tabular storage structure. The computer can then execute a program using the tabular storage structure. The code of the tabular storage structure governs an operation of the program.

26 Claims, 6 Drawing Sheets

(56) References Cited

OTHER PUBLICATIONS

A. Avritzer, J.P. Ros, and E.J. Weyuker, Estimating the CPU utilization of a rule-based system, in *Proceedings of the fourth international workshop on Software and performance*, Redwood Shores, California, 2004. pp. 1-12.

H.E. Bal, M. F. Kaashoek, and A. S. Tanenbaum, Orca: a language for parallel programming of distributed systems, *Software Engineering IEEE Transaction on*, vol. 18, pp. 190-205, 1992.

D.S. Batory, Conceptual-to-internal mappings in commercial database systems, In *SIGACT-SIGMOD symposium on Principles of database systems*, Waterloo, Ontario, 1984. pp. 70-78.

M. Bauer, B. Bruegee, G. Klinker, a. MacWilliams, T. Reicher S. Riβ, C. Sandor, and M. Wagner, Design of a Component-Based Augmented Reality Framework, In *Proc. ISAR '01 (IEEE and ACM Int. Symposium on Augmented Reality)*, New York, NY, 2001. pp. 45-54.

B. Bell, S. Feinder, and T. Höllerer, View Management for Virtual and Augmented Reality, *In Proc. ACM Symp. On User Interface Software and Technology 2001*, Orlando, FL, 2001. pp. 101-110.

Best, M.-A. Storey, and J. Michaud, Designing a component-based framework for visualization in software engineering and knowledge engineering, in *Proceedings of the 14th international conference on Software engineering and knowledge engineering*, Ischia, Italy: ACM Press, 2002, pp. 323-326.

D.S. Batory and C.C. Gotlieb, A unifying model of physical databases, *ACM Trans. Database Syst.*, vol. 7, pp. 509-539, 1982.

G. Booth, *Object-Oriented Analysis and Design with Applications (3rd Edition)*; Addison Wesley Longman Publishing Co., Inc. 2004.

S. Ceri, P. Fraternali, S. Paraboschi, and L. Tanca, Automatic generation of produciton rules for integrity maintenance, *ACM Trans. Database Syst.*, vol. 19, pp. 367-422, 1994.

U. Dayal, M. Hsu, and R. Ladin, Organizing long-running activities with triggers and transactions, *In Proceedings of the 1990 ACM SIGMOD international conference on Management of data*, Atlantic City, New Jersey, 1990. pp. 204-214.

D. J. DeWitt, R. H. Katz, F. Olken, L. D. Shapiro, M. R. Stonebraker and D. Wood, Implementation techniques for main memory database systems, In *Proc. ACM SIGMOD international conference on Management of data*, Boston, Massachusetts, 1984. pp. 1-8.

K. P. Eswaran, Aspects of a trigger subsystem in an integrated database system, In *Proceedings of the 2nd International Conference on Software Engineering*, San Francisco, California, United States, 1976. pp. 243-250.

Feiner, B. MacIntyre, and D. Seligmann, Knowledge-based augmented reality, *Communications of the ACM*, vol. 36, pp. 53-62, 1993.

S. Feiner, B. MacIntyre, T. Höller, and A. Webster, A Touring Machine: Prototyping 3D Mobile Augmented Reality Systems for Exploring the Urban Environment, in *Proc. ISWC '97 (First Int. Symp. On Wearable Computers)*, Cambridge, MA, 1997, pp. 74-81.

S. Feiner, S. Nagy, and A. v. Dam, An experimental system for creating and presenting interactive graphical documents, *ACM Trans. Graph.*, vol. 1, pp. 59-77, 1982.

J. Foley, C. Gibbs, and S. Kovacevic, A knowledge-based user interface management system, *In Proceedings of the SIGCHI Conference on Human Factors in Computing Systems*, Washington, D.C., 1988, pp. 67-72.

C. L. Forgy, On the efficient implementation of production systems, 187 pages, 1979.

C. L. Forgy, Rete: A Fast Algorithm for the Many Pattern/Many Object Pattern Match Problem, *Artificial Intelligence*, vol. 19, pp. 17-37, 1982.

E. Friedman-Hill, Jess: The Java Expert System Shell. Distributed Computing Systems, Sandia National Laboratories, Livermore, CA, 1998.

M. T. Garrett and J. D. Foley, Graphics Programming Using a Database System with Dependency Declarations, *ACM Trans. Graph.*, vol. 1, pp. 109-128, 1982.

J. Gosling, B. Joy, G. Steele, and G. Bracha, *The Java Language Specification*: Addison Wesley, 1997.

J. Gray, P. Helland, P. O'Neil, and D. Shasha, The dangers of replication and a solution, *In Proceedings of the 1996 ACM SIGMOD International Conferenece on Management of Data*, Montreal, Quebec, Canada, 1996, pp. 173-182.

J. Gray and A. Reuter, *Transaction Processing: Concepts and Techniques*. San Francisco, CA: Morgan Kaufmann, 1993.

A. Gupta, C. Forgy, and A. Newell, High-speed implementations of rule-based systems, *ACM Transactions on Computer Systems (TOCS)*, vol. 7, pp. 119-146, 1989.

P. E. Haeberli, ConMan: A visual programming language for interactive graphics, in *Proceedings of the 15th annual conference on Computer graphics and interactive techniques*: ACM Press, 1988, pp. 103-111.

G. Hesina, D. Schmalstieg, A. Fuhramann, and W. Purgathofer, Distributed Open Inventor: A Practical Approach to Distributed 3D Grahics, *In. Proc. VRST '99*, N.Y., 2000. pp. 74-81.

T. Höllerer, Ph. D Thesis. User Interface for Mobile Autmented Systems. Computer Science, Columbia University, New York City, 2004.

T. Höllerer, S. Feiner, T. Terauchi, G. Rashid, and D. Hallaway, Exploring MARS: Developing Indoor and Outdoor User Interfaces to a Mobile Augmented Reality System, *Computers and Graphics*, vol. 23, pp. 779-785, 1999.

W. M. Johnston, J. R. P. Hanna, and R. J. Millar, Advances in dataflow programming languages, *ACM Comput. Surv.*, vol. 36, pp. 1-34, 2004.

D. Jordan, K. McKeown, K. Concepcion, S. Feiner, and V. Hatzivassiloglou, Generation and evaluation of interaoperative inferences for automated health care briefings and patient status after bypass surgery, *Journal of the American Medical Informatics Association*, vol. 8, pp. 267-280, 2001.

D. Jordan, G. Whalen, B. Bell, K. McKeown, and S. Feiner, An evaluation of automatically generated briefings of patent status, In *Proc. Medinfo*, San Francisco, CA, 2004, pp. 227-231.

W. Kent, A simple guide to five normal forms in relational database theory, *Commun, ACM*, vol. 26, pp. 120-125, 1983.

B. W. Kernighan and D. M. Ritchie, *The C Programming Language*, Englewood Cliffs, N.J.: Prentice-Hall, 1988.

J. Kodosky, J. MacCrisken, and G. Rymar, Visual programming using structured data flow, In *Visual Languages, 1991., Proceedings. 1991 IEEE Workshop on*, 1991. pp. 34-39.

T. J. Lehman and M. J. Carey, Query processing in main memory database management systems, In *Proc. SIGMOD International Conference on Management of Data*, Washington DC, 1986. pp. 239-250.

K. Li and P. Hudak, Memory coherence in shared virtual memory systems, *ACM Trans. Comput. Syst.*, vol. 7, pp. 321-359, 1989.

D. H. Lorenz and J. Vlissides, Designing components versus objects: A transformational approach, in *Proceedings of the 23rd International Conference on Software Engineering*. Toronto, Ontario, Canada: IEEE Computer Society, 2001, pp. 253-262.

B. MacIntyre, Exploratory Programming of Distributed Augmented Environments. Computer Science, Columbia University, New York City, 1999.

B. MacIntyre and S. Feiner, A Distributed 3D Graphics Library, in *Computer Graphics (Proc. ACM SIGGRAPH '98) Annual Conference Series*. Orlando, FL, 1998, pp. 361-370.

B. MacIntyre and S. Feiner, Language-Level Support for Exploratory Programming of Distributed Virtual Environments, in *Proc. UIST' 96*. Seattle, WA 1996, pp. 83-94.

J. Mackinlay, Automating the design of graphical presentations of relational information, *ACM Trans. Graph.*, vol. 5, pp. 110-141, 1986.

K. McKeown, D. Jordan, S. Feiner, J. Shaw, E. Chen, A. Shabina, A. Kushniruk, and V. Patel, A study of communication in the cardiac surgery intensive care unit and its implications for automated briefing, In *Proc AMIA Symp*, Los Angeles, CA 2000.

D. Miranker, TREAT: A new and efficient match algorithm for AI production systems, Ph. D. dissertation, Computer Science, Columbia University, New York, Jan. 1987.

P. Mishra and M. H. Eich, Join processing in relational databases, *ACM Comput. Surv.*, vol. 24, pp. 63-113, 1992.

(56) References Cited

OTHER PUBLICATIONS

K. Oflaser, Partitioning in parallel processing of production systems. Ph.D. dissertation, Computer Science, Carnegie-Mellon University, Pittsburgh, 1986.

A. Olwal and S. Feiner, Unit: modular development of distributed interaction techniques for highly interactive user interfaces, in *Proceedings of the 2nd international conference on Computer graphics and interactive techniques in Australasia and Southe East Asia*. Singapore: ACM Press, 2004, pp. 131-138.

OpenGL Architecture Review Board, *OpenGL Reference Manual: the Official Reference Document for OpenGL*, Release 1: Addison-Wesley, 1993.

N. W. Paton and O. Diaz, Active database systems, *ACM Comput. Surv.*, vol. 31, pp. 63-103, 1991.

W. Piekarski and B. H. Thomas, Tinmith-evo5-a software architecture for supporting research into outdoor augmented reality environments, University of South Australia, Technical report 2002.

S. G. Robertz, Applying priorities to memory allocation, in *ISMM'02: Proceedings of the 3rd international symposium on Memory management*, Berlin, Germany, 2002. pp. 108-118.

D. Schmalstieg, A. Fuhrmann, G. Hesina, Z. Szalavári, L. M. Encarnaçaão, M. Gervautz, and W. Purgathofer, The studierstube augmented reality project, *Presence: Teleoper. Virtual Environ.*, vol. 11, pp. 33-54, 2002.

W. J. Schroeder, K. M. Martin, and W. E. Lorensen, The design and implementation of an object-oriented toolkit for 3D graphics and visualization, *In Proceedings of the 7th conference on Visualization '96*, San Francisco, California, United States, 1996. pp. 93-ff.

D. L. Spooner, Database support for interactive computer graphics, In *Proceedings of the 1984 ACM SIGMOD International Conference on Management of Data*, Boston, Massachusetts, 1984. pp. 90-99.

S. Stolfo and D. Shaw, DADO: A tree-structured machine architecture for production systems, In *Proc. National Conference on Artificial Intelligence*, Pittsburgh, PA, 1982. pp. 242-246.

C. Szperski. *Component Software, Beyond Object-Oriented Programming*, Addison-Wesley, 1997.

J. Wemecke, *The Inventor Mentor*: Addison-Wesley, 1994.

J. W. Wendorf, A simply extended and modified batch environment graphical system (SEMBEGS), *Commun. ACM* vol. 21, pp. 897-904, 1978.

M. Zhou and S. Feiner, Data Characterization for Automatically Visualizing Heterogeneous Information, *In Proc. IEEE Symp. On Information Visualization*, San Francisco, CA, 1996. pp. 13-20.

\* cited by examiner

COMPUTER PROGRAM COMPOSED FROM TABULAR STORAGE STRUCTURES THAT INCLUDES DATA AND CODE

CROSS REFERENCE TO RELATED APPLICATIONS

This application claims the benefit of U.S. Provisional Application Ser. No. 60/790,376, filed Apr. 7, 2006 and U.S. Provisional Application Ser. No. 60/841,582, filed Aug. 30, 2006, each of which is incorporated by reference in its entirety herein, and from which priority is claimed.

STATEMENT REGARDING FEDERALLY SPONSORED RESEARCH

The subject matter disclosed herein was funded in part by the United States Office of Naval Research, under Grant N00014-04-1-0005. Accordingly, the United States Government may have certain rights.

BACKGROUND

The application relates generally to the field of generating and manipulating distributed computer programs for computers on a network.

The use of conventional high-level programming languages (e.g., Java, C++, C#, or C) to create programs for a network of computers that allow the computers to communicate with each other to accomplish a task can be very complex. In order to allow the computers in such a network to communicate with one another successfully, programmers must utilize complex network protocols, remote function calls, and complicated logic.

Further, such programming can be cumbersome and time consuming. For example, if a bug is found in a particular program during execution, the program that requires modification will need to be shut down, its code will need to be modified and recompiled, and the program will need to be restarted. In some cases, programs running on other computers within the network that are integrated with the program that needs to be shut down will also need to be shut down and restarted in order to account for changes to protocols or shared libraries. Programs that rely on complicated graphical rendering models and associated large files may have long start-up times and thus will additionally slow program development.

In addition, because these programs are written in high-level, abstract programming languages, it is often difficult for programmers to track and/or control directly the amount of memory that the programs are using. Further, without the ability to directly control the memory utilized by these programs, programmers have difficulty in optimizing the amount of network bandwidth versus the amount of memory used by the programs.

Accordingly, there exists a need for a programming technique that permits programmers to generate distributed programs for thin-client networked computers and, more generally, for networked computers structured according to any of the following models: client-server, peer-to-peer, or hybrid, which is a combination of the previous two models.

SUMMARY

The application provides a programming technique, referred to herein as "Data Programming" ("DP"), that facilitates the generation of distributed programs that are flexible and extensible.

The application also provides a programming technique that facilitates generation of complex distributed logic through the use of tabular structures.

The application provides methods and systems for declarative rule-based programming in which a distributed program is defined through tabular structures. The tabular structures store the logic, including data (e.g., primitive variables and dynamic data structures) and code (e.g., arguments and functions), that governs operation of the distributed program.

The disclosed subject matter facilitates generation of distributed programs, programmer control over memory and network usage, and modifications to a program without having to recompile and/or restart the program.

The accompanying drawings, which are incorporated and constitute part of this disclosure, illustrate embodiments of the disclosed subject matter.

DETAILED DESCRIPTION

Figure 1A:
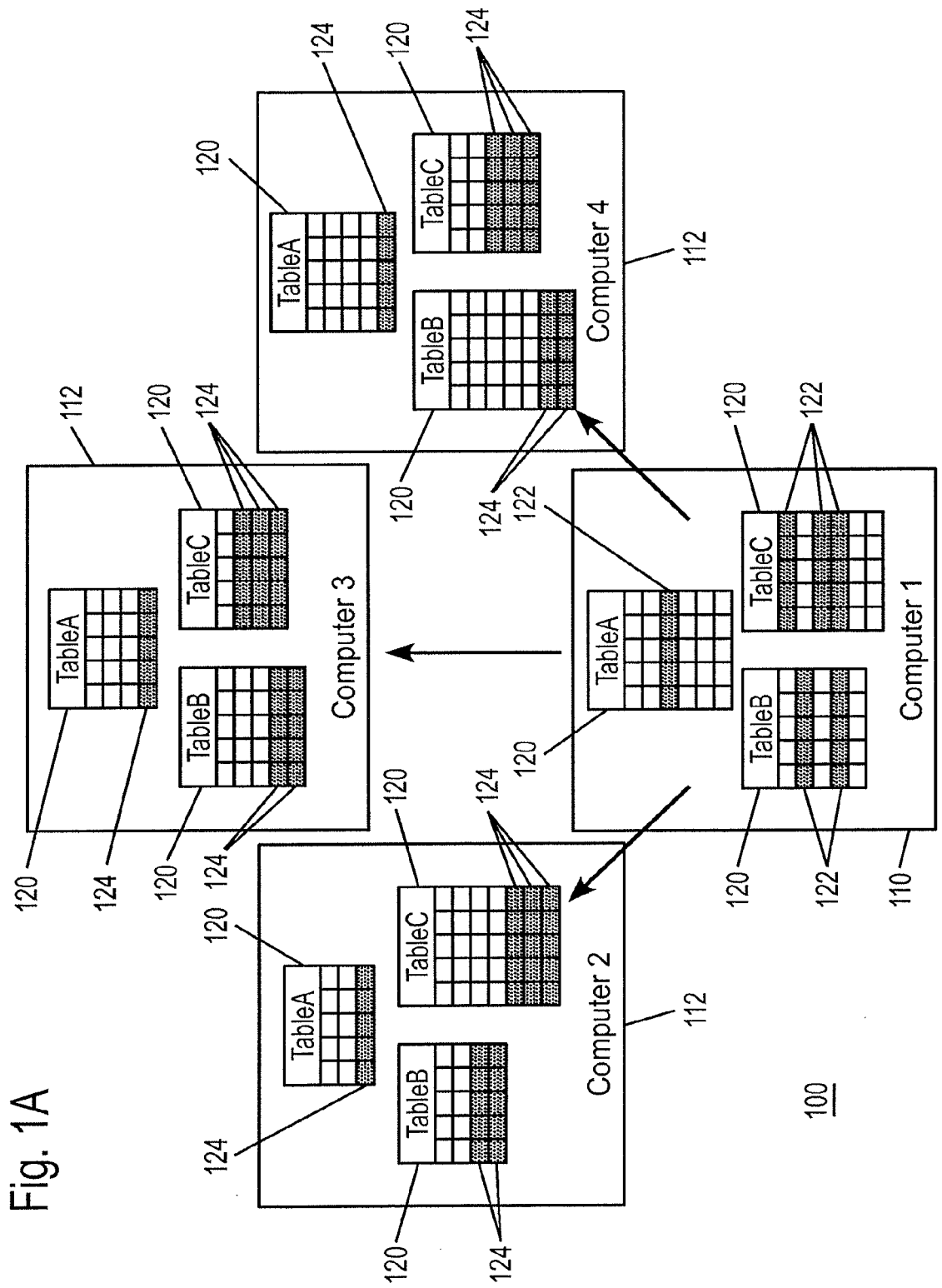
FIG. 1A is a schematic diagram of a network of computers in which one of the computers in the network transmits master records to the other computers in the network.
Figure 1B:
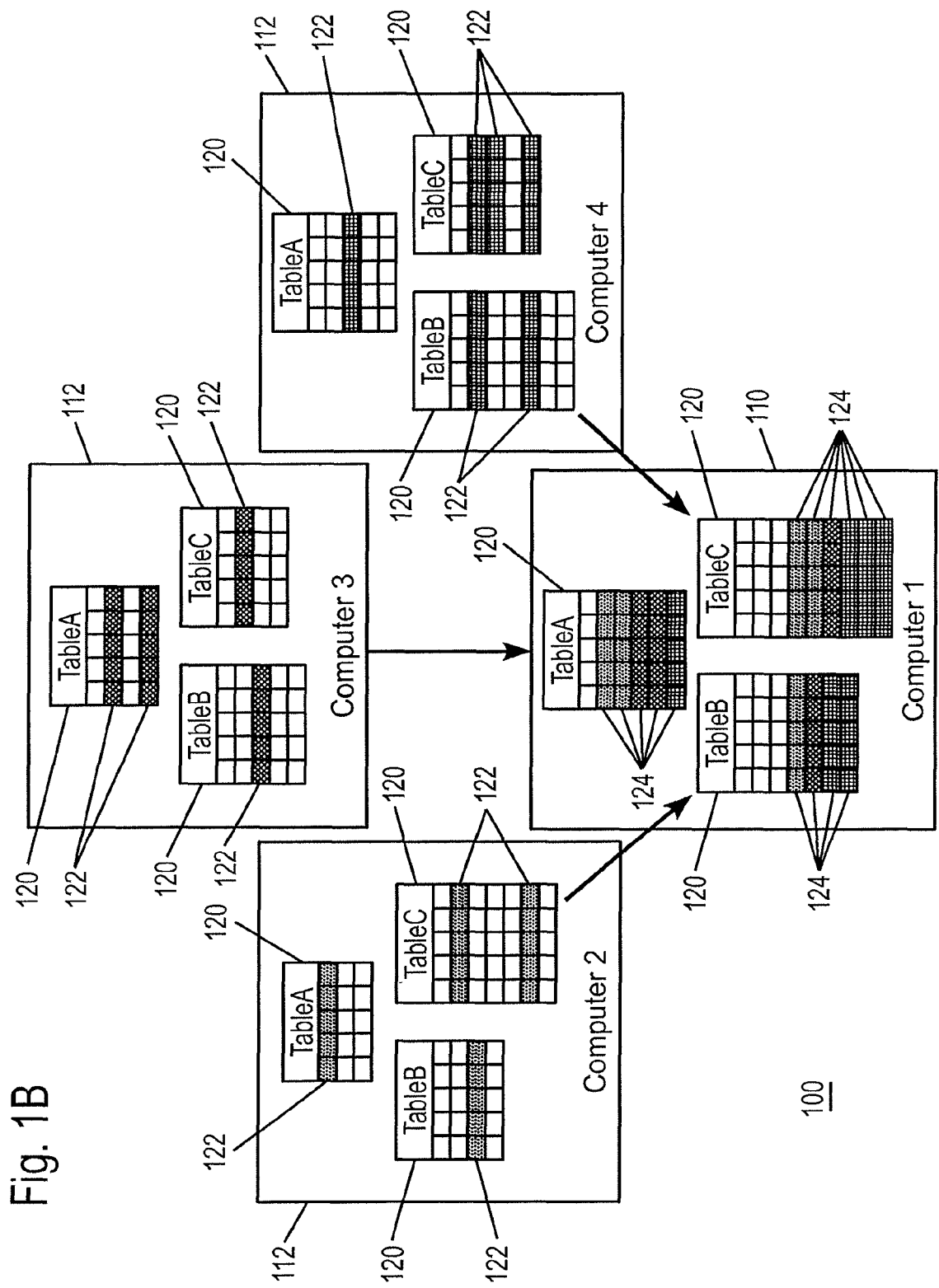
FIG. 1B is a schematic diagram of a network of computers in which one or more computers in the network transmit master records to another computer in the network.

DP is a declarative rule-based programming method that involves defining and manipulating distributed logic, also referred to as a distributed program, throughout a system of interconnected computers, such as computer network 100 in FIGS. 1A and 1B. Computer network 100 includes a plurality of interconnected computers that preferably include a computer 110 and one or more computers 112 that may communicate through Transmission Control Protocol ("TCP), User Datagram Protocol ("UDP"), or any other suitable protocol. Computer 110 and computers 112 will be referred to collectively as "computers 110, 112" and generically as "computer 110, 112." The computer network 100 may be structured according to any of the following models: client-server, peer-to-peer, or hybrid, which is a combination of the previous two models. In some embodiments, computer 110 is a server having enough memory to hold the distributed information received from each of computers 112 connected to it, and computers 112 are client computers, for example thin-client personal computers. Alternatively, in some embodiments, computers 110, 112 can each be any computer capable of connecting to other computers in the network. The term "computer" is intended to include any digital data processing device (e.g., laptops, personal computers, cellular phones, personal digital assistants, etc.).

Each computer 110, 112 of computer network 100 maintains in its memory at least one table 120, having columns and rows, that stores data (e.g., primitive variables and dynamic data structures) and code (e.g., arguments and functions, including support for user interfaces and graphics) in columns of rows that define the distributed program. In FIG. 1A, each computer 110, 112 maintains three tables 120: "TableA," "TableB," and "TableC." Tables 120 depicted in FIG. 1A correspond to the distributed program's memory. Although each computer 110, 112 maintains three tables 120 in FIG. 1A, computers 110, 112 need not have the same number of tables 120.

Defining the distributed program through the use of tables 120 on computers 110, 112 allows for simpler and more rapid development of the distributed logic vital to implementing the distributed program. Instead of having to manage protocols, structures, and remote function calls, as is the case when developing a conventional distributed program utilizing programming languages such as Java, C, or C++, developing a distributed program according to the disclosed subject matter includes adding columns and rows to tables 120.

Column definitions determine the structure of tables 120 and can be shared by all computers 110, 112 on the network 100. Such columns may be defined as data columns and/or function columns. When defined as a function column, the column defines each particular field within the column.

Rows may be allocated in tables 120 on each computer 110, 112 and include data and functions defined by the columns. Each computer 110, 112 may be allocated with rows in tables 120. However, as will be described below, each computer 110, 112 may receive copies of rows from other computers 110, 112.

Unlike other object-oriented systems, the definitions of tables 120 are not constrained to one file or a pre-compiled header. Instead, the definitions of tables 120 and columns may be independent, allowing parts of a program that span multiple tables 120 to be grouped together using functions. In addition, tables 120 may be changed at run-time after rows have been allocated. Thus, new functionality may be added to the distributed program during run-time through the addition of new columns and/or rows to tables 120 on computers 110, 112. When adding a column to a particular table 120, DP automatically changes the definitions of the table 120 and extends the memory of every row that is currently allocated for that table 120.

The distribution of the data and logic of the distributed program to computers 110, 112 of a network 100 that occurs when rows or columns are allocated (during program initialization or execution) or updated (during program execution) will be discussed referring to FIGS. 1A and 1B. In the illustrated embodiment, although all computers 110, 112 maintain a copy of tables 120 locally, only a single computer 110, 112 maintains a master record 122 of data for a particular row for a particular table 120. For example, in FIG. 1A, the shaded rows in "TableA," "TableB," and "TableC" stored on computer 110 are master records 122. Computer 110 is the only computer 110, 112 that can make changes to the master records 122. On the other hand, computers 112 are the computers that receive a copy of the master records 122 from computer 110 when the master records 122 are allocated during program initialization or program execution or when the master records 122 are modified during program execution. Computers 112 thus maintain copies 124 of the master records 122 in tables 120 in their respective memories. For example, the shaded rows in "TableA," "TableB," and "TableC" stored on computers 112 are copies 124 of the master records 122 stored on computer 110.

Thus, in FIG. 1A, when the master records 122 are allocated in tables 120 during program initialization or program execution, computer 110 may distribute the master records 122 to one or more computers 112 that are connected to computer 110. Alternatively, when the master records 122 are allocated in tables 120 during program initialization or program execution, computer 110 may not immediately distribute the master records 122 to one or more computers 112 that are connected to computer 110, but may do so at a later time. In addition, if the master records 122 are modified during program execution, the updates to the master records 122 are transmitted, in a similar fashion, to one or more computers 112 that are connected to computer 110. The copies 124 of the master records 122 are stored in tables 120 residing in the memory of each computer 112. The copies 124 of the master records 122 may be removed from computers 112 without having to remove the master records 122 from computer 110.

In FIG. 1B, each computer 112 may maintain master records 122 for rows in tables 120 that reside in the memory of computer 112. One or more computers 112 may transmit the master records 122 allocated during program initialization or during program execution to computer 110. In addition, if the master records 122 of a particular computer 112 are modified during program execution, the changes to the master records 122 are transmitted to update related rows on computer 110 in the same way.

As will be discussed in more detail in connection with FIG. 4, in another embodiment, changes in some columns of master records 122 may not be transmitted from the computer 110, 112 that maintains the master records 122 to the computers 110, 112 that do not maintain the master records 122. Changes to other columns of master records 122, however, may be transmitted from the computer 110, 112 that maintains the master records 122 to computers 110, 112 that do not maintain the master records 122, as discussed above generally in connection with FIGS. 1A and 1B. The computer 110, 112 that maintains the master records 122 is the only computer 110, 112 that will transmit updates to all computers 110, 112 that have copies 124 of the master records 122 if columns of the master records 122 that have been defined as "distributed" are altered. Because only one computer 110, 112 preferably should alter the distributed columns of a particular master record 122, the problem of having tables 120 that have conflicting data associated with a particular row is avoided.

It should also be noted that although all of the tables 120 stored on computers 110, 112 do not need to have identical structures (i.e., identical column definitions), the distributed program will often be less complex if the corresponding distributed tables 120 (e.g., "TableA," "TableB," or "TableC") on each computer 110, 112 have identical structures. The reason for this is because, in the case when tables 120 do not have identical structures, additional data to account for the transformations between different table 120 structures on different computers 110, 112 will need to be transmitted with the master records 122 sent between computers 110, 112. However, when tables 120 having identical structures are used, the data comprising allocations and updates of the master records 122 can be transmitted to computers 110, 112 with the same column offsets as the master records 122.

In one embodiment, if a computer 110, 112 loses connection from the other computers 110, 112 during program execution, all of copies 124 of the master records, e.g., 122, that can be maintained by that computer 110, 112 are removed from the tables 120 of the computers 110, 112 that are still interconnected in such a way as to allow the distributed program running on computers 110, 112 that are still interconnected to continue to function. If the computer 110, 112 reconnects with the other computers 110, 112, that computer 110, 112 receives all copies 124 of master records 122 that are intended to be distributed to that computer 110, 112. The master records that were maintained on this newly reconnected computer 110, 112, are redistributed to the other computers 110, 112.

By using the method for distributing the logic described above in connection with FIGS. 1A and 1B, distributed programs for client-server, peer-to-peer, and hybrid systems may be developed. Because functions, along with arguments to the functions, may be distributed between computers 110, 112 by transmitting rows between computers 110, 112, the functions may be executed on both computer 110 and computers 112, but not necessarily at the same times.

By distributing functions and arguments as opposed to just data, the amount of data that needs to be distributed between computers 110, 112 may be minimized. For example, if the time since an event occurred needs to be calculated, distributed, and displayed on multiple computers 110, 112, the data comprising a compressed time value associated with the event may be distributed to computers 112 with a function for converting the data to the necessary display format, such as a string. When computers 112 need to display and/or update the time, computers 112 may cause the function that was transmitted to be executed. The function uses the data that was transmitted and outputs the time in a string that can be displayed. Thus, even though the time value was transmitted in a compressed format, computers 112 are capable of decompressing the time value because the function was instantiated within the table row that was transmitted.

For certain types of data, it might not be necessary or optimal to transmit the data in a row to every computer 110, 112 in the distributed system each time the data changes, as was described in connection with FIG. 1A. For example, if the data changes frequently, the data should be sent to only those computers 110, 112 that require this data (e.g., for display). For this reason, DP provides a mechanism by which computer 110 sends the master record 122 associated with a row to only those computers 112 that require this data. Thus, in FIG. 1A, although the master records 122 were transmitted from computer 110 to all computers 112, depending on the way the tables 120 are defined, discussed in more detail in connection with FIG. 4, the master records 122 may be distributed to one computer 112, a group of computers 112, or all computers 112, as further discussed in FIG. 2.

Figure 2:
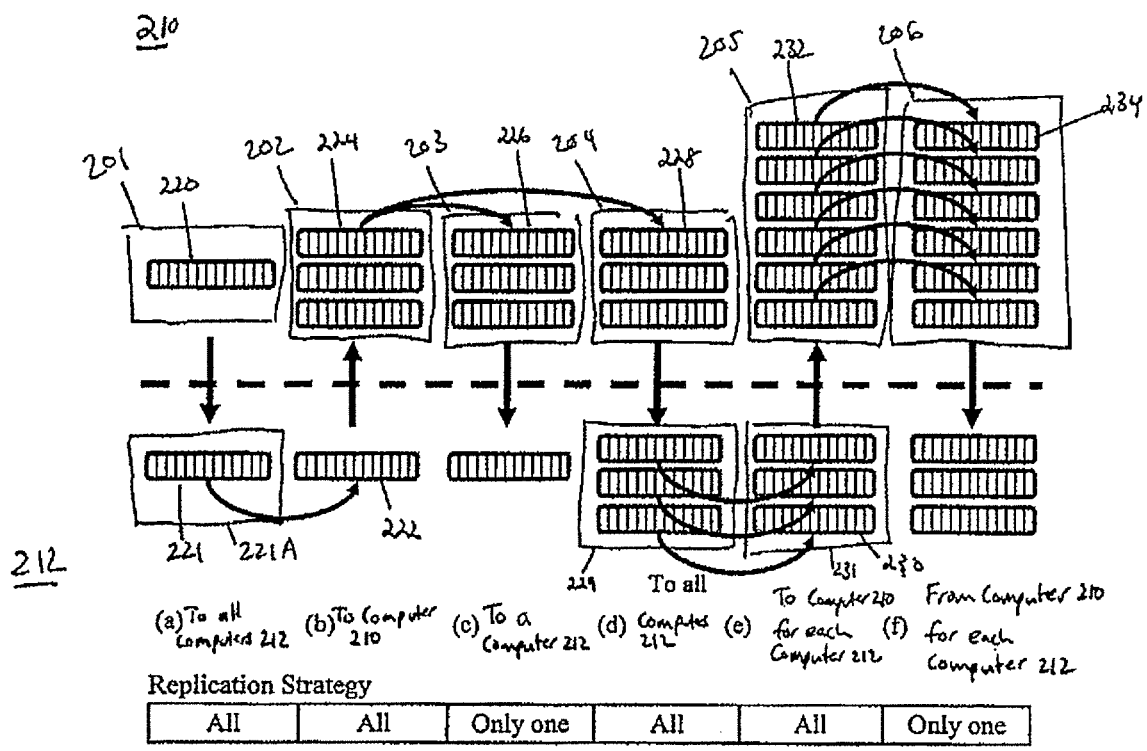
FIG. 2 is a schematic diagram of flows of information between a computer and three other computers related to an entity in a distributed system based on differing replication strategies contained in tables.

FIG. 2 shows flows of information between a computer 210 and three computers 212 related to an entity in a distributed system 200 based on differing replication strategies contained in tables 201, 202, 203, 204, 205, and 206 on computer 210. Computer 210 may, for example, be a server computer, and computers 212 may be remote client computers. However, other network arrangements may be made as those skilled in the art will appreciate. Although FIG. 2 shows flows of information between a computer 210 and three computers 212, any number of computers 212 greater than or equal to one may be used. The entity may include an object, a concept, or a situation. In (a), row 220 of table 201 of computer 210 is initialized with information describing the entity. Next, row 220 is transmitted to all computers 212 and is received in table 221A.

In (b), for each row 221 received in table 221A on each computer 212, a row 222 is created. Each computer 212 sends back to computer 210 row 222 related to the entity, which is stored in table 202 in newly allocated rows 224.

In (c), table 203 on computer 210 is initialized with new rows 226 related to the entity based on the rows 222 received in (b) as rows 224 from each computer 212. Then, computer 210 transmits a single row from the new rows 226 in table 203 only to one computer 212, which is the same computer 212 from which the related row 224 was received.

Alternatively, in (d), all of the computers 212 (as opposed to just one computer 212 in (c)) might require receipt of information related to the entity based on data received from computers 212 in (b). In order to achieve this, table 204 on computer 210 is populated with new rows 228 related to the entity based on the data received in (b) from each computer 212. Then, computer 210 transmits all of the new rows 228 in table 204 to all computers 212.

In (e), rows 230 in table 231 are created for each row received in table 229 in (d) on each computer 212. Each of these rows 230 contains information about a computer 212 related to the entity and is sent back to computer 210. Computer 210 receives the new rows 232 (not all are shown) from computers 212 in table 205 that store the information sent by each computer 212 about other computers 212 related to the entity.

Lastly, in (f), rows 234 in table 206 are created for each row 232 received in table 205 in (e). Rows 234 in table 206 contain information about the entity related to a particular computer 212. Each row 234 is transmitted to an individual computer 212, which is not necessarily the same computer 212 to which the information in the row is related.

As a result of these different strategies described in connection with FIG. 2, information can be propagated between computer 210 and computers 212 as well as between computers 212 if no direct connection exists.

Figure 3:
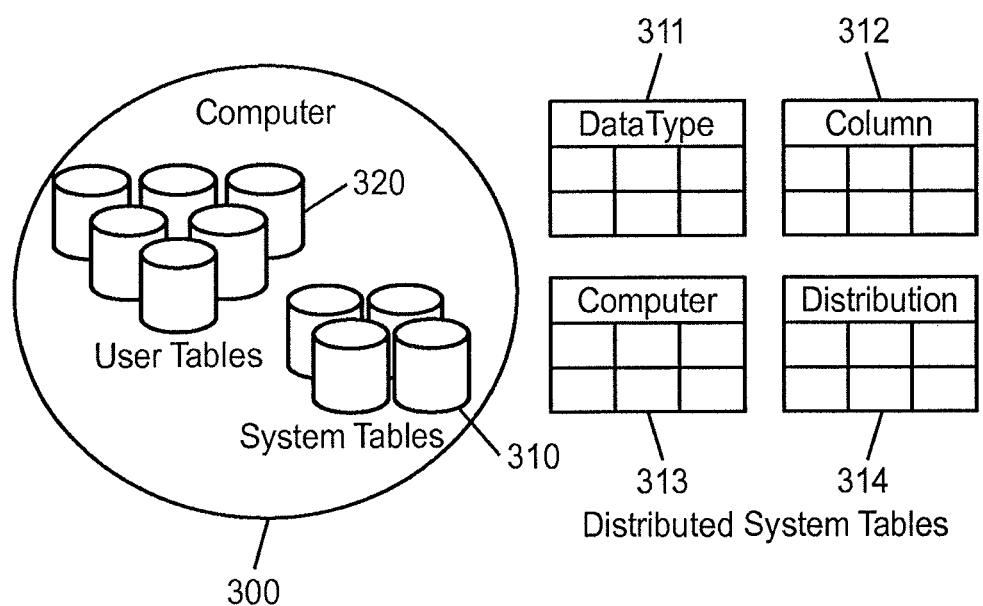
FIG. 3 is a schematic diagram of a computer in a distributed DP programming network according to an embodiment of the disclosed subject matter.

FIG. 3 is a schematic diagram of computer 300 in a distributed programming network according to an embodiment of the disclosed subject matter. Computer 300 may correspond to computers 210 or 212. Computer 300 includes user tables 320, which are application specific tables, such as those discussed above in connection with FIG. 2 (i.e., tables 201-206). The user tables 320 can additionally be used to maintain and distribute other information. For example, one embodiment of a distributed system may include a computer 300 with multiple displays, wherein only one user may view one display (e.g., through the use of a head-worn display). In this particular case, in order to create and maintain logic for users, it is important to create additional tables, similar to the set of tables described above in connection with FIG. 2, but instead to keep track of user information relating to the entities within the system.

System tables 310 keep track of the distribution logic architecture (including remote computers, distributed tables, rows, columns, and distribution strategies) and thus dictate the replication strategies that occur in distributed programs that were discussed in connection with FIG. 2. System tables 310 may include a DataType table 311, a Column table 312, a Computer table 313, and a Distribution table 314 that will be described more fully in connection with FIG. 4.

Figure 4:
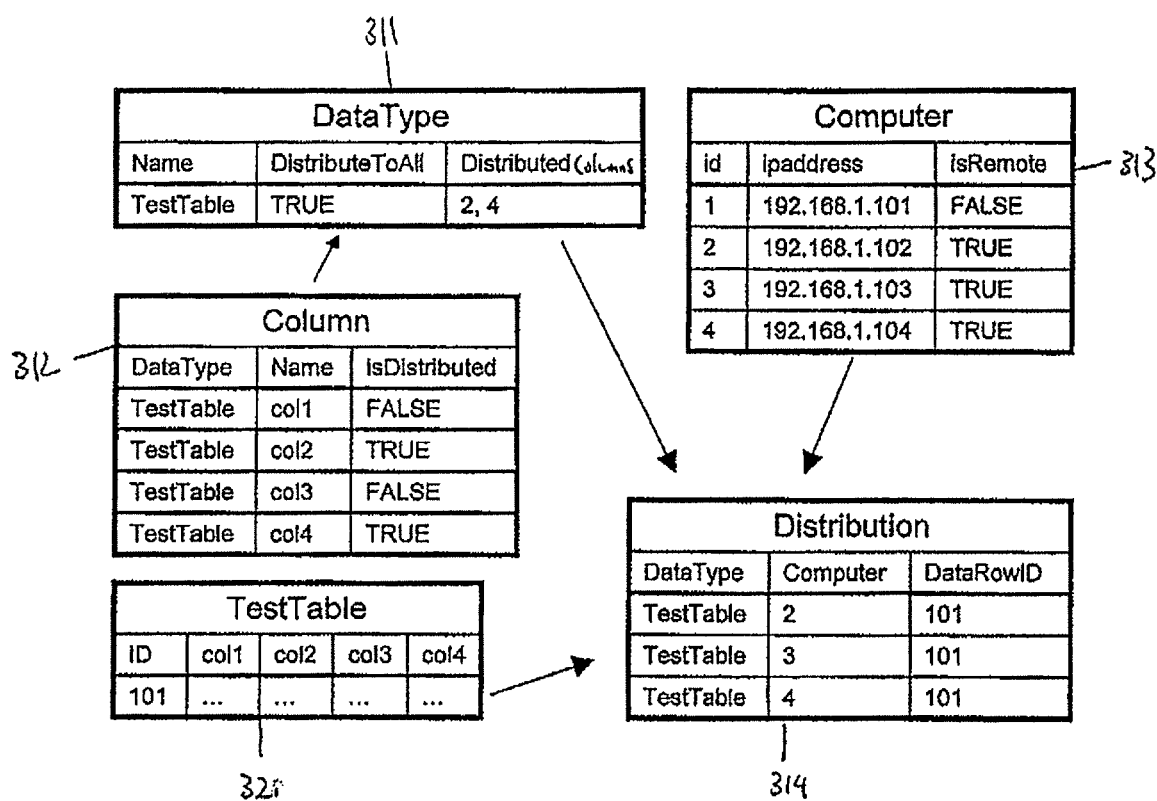
FIG. 4 is a schematic diagram showing a relationship between system tables and a user table residing on a computer in a distributed DP programming network according to an embodiment of the disclosed subject matter.

FIG. 4 is a diagram showing a relationship between one embodiment of the system tables 310 and a user table 321 of user tables 320 of FIG. 3 residing on computer 210. DataType table 311 and Column table 312 store the definitions of the distributed tables and distribution strategies. In this particular embodiment, the rows shown in the DataType table 311 and Column table 312 determine the distribution strategy for the user table 321 (which is named "TestTable" in this figure). For example, the "is Distributed" column of Column table 312 reflects the distribution strategy that the rows with "Name" "col2" and "col4" of user table 321 are to be distributed to one or more computers 212, while the rows with "Name" "col1" and "col3" are not to be distributed. DataType table 311 instructs the computer 210 to distribute "DistributedColumns" "2" and "4", which correspond to "col2" and "col4" of user table 321 respectively, to all computers 212 because the corresponding "DistributeToAll" value is "TRUE."

Computer table 313 describes information related to networked computers 210, 212. For example, the Computer table 313 stores IP addresses of computers 210, 212 on the network and data indicating whether or not the computers are remote computers. For example, the row with "id" value "1" of Computer table 313 corresponds to the computer 210 with "ipaddress" value "192.168.1.101" because its "is Remote" value is "FALSE." Further, row with "id" value "2" of Computer table 313 corresponds to a computer 212 with "ipaddress" value "192.168.1.102" because its "is Remote" value is "TRUE."

The Distribution table 314 tracks to which computers 212 (i.e., "Computer") a message corresponding to the master record 122 (i.e., "DataRowID") of user table 321 (i.e., "TestTable" referenced in the first record of the DataType table) of computer 210 must be sent when the master record 122 is allocated (during program initialization and execution), when the master record 122 has been modified (during program execution), and when the master record 122 is deleted (during program execution). For example, the row with the value "101" in its "id" column of user table 321 is to be distributed to computers "2," "3," and "4." However, not all column values in row "101" are transmitted to computers "2," "3," and "4." The column data in row 101 that is sent to the aforementioned computers is determined by the DataType table 311 and the Column table 312 discussed above. One skilled in the art would be able to generate more complex distribution strategies than those described and illustrated in connection with FIG. 4.

Figure 5:
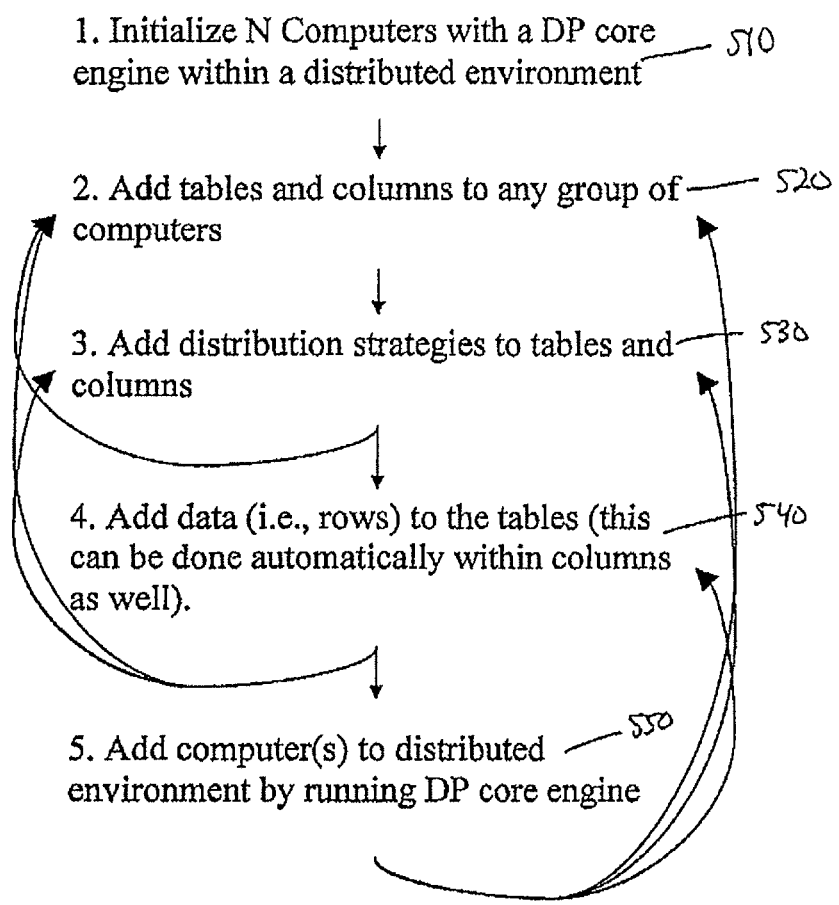
FIG. 5 is a diagram of the process for developing an application within a distributed DP environment according to an embodiment of the disclosed subject matter.

FIG. 5 is a diagram of the process for developing an application within a distributed DP environment according to one embodiment of the disclosed subject matter. In 510, an arbitrary number of interconnected computers on a network are initialized with a DP core engine that embodies the DP approach within a distributed environment. The DP core engine may be embodied in software, hardware, or some combination thereof that those skilled in the art would appreciate. In 520, tables and columns are added to any group of computers within the distributed environment. In 530, the distribution strategies are added to the tables and columns. In 540, rows (i.e., data) are added to the tables. Finally, in 550, computers are added to the distributed environment by running the DP core engine. It should be noted that once the DP core engine is initialized on a computer in the distributed network, the DP core engine will not need to be restarted in order to make modifications to the distributed program. In addition, there is no need to compile the code for the distributed program running on any of the computers in the distributed environment.

In addition, DP uses a unified function to create, change, remove, and process all information within DP. While the tables retain data and functions that are used frequently throughout the program (e.g., graphical functions and their arguments that get executed every time a frame is rendered), the unified function is used for programming logic that is used less often, such as table lookups, changes, and memory/row allocations or de-allocations.

There are three levels of operations in the unified function, which, from lowest level to highest level, are: (1) system functions, which account for fundamental functions and are similar to assembly-code functions (but, in contrast to assembly-code functions, are not necessarily dependent upon hardware, although they may take advantage of hardware); (2) user-defined functions, which temporarily allocate memory to recursively call the unified function as a sequence of commands that share arguments; and (3) memory allocation/de-allocation functions, which create or remove a row in a table.

This unified function provides further control of memory because each of these three levels has a different memory usage. For example, system functions use stack memory and do not have any persistent memory once the system functions have finished executing. User-defined functions have the same behavior when executed, but because they are not included in the core DP distribution, the actual functions reside in memory (hence, they take up memory) and can be added/removed based on how often they are used. The allocation/de-allocation functions allow the memory control of the persistent tables, which includes adding/removing tables, columns, rows, and arguments.

Furthermore, system functions provide features that make it easy to further manipulate the data and memory in a DP program. For example, some functions are only used once, such as startup scripts that initialize tables, columns, and rows. In this case, a system function may be provided to read a function from a file by executing each line in the file as a separate call to the unified function. Although the system function may execute actions that create persistent entities, such as creating tables, columns, and rows, the actual system function may not have any resident memory once it has finished execution.

DP facilitates: (1) calculation and management of the amount of memory used (i.e., the amount of memory used is directly related to the table and column definitions and how many rows have been created); (2) programming complex distributed logic using table replication strategies, such as those described above in connection with FIG. 2; and (3) modification of a distributed program at run-time without the need to recompile or restart the distributed program.

In particular, DP allows a programmer to explicitly control how much network bandwidth and computer memory the program consumes, both during program initialization and execution. Depending on the hardware being used, these resources might have differing limitations. For example, a hand-held device might have more memory and a faster processor than a cellular phone, but a slower network connection. Thus, when designing the program, it might be useful to utilize the memory of the hand-held device to a greater extent than the network in order to avoid slow responses from a user interface. DP allows programmers to make such decisions about memory and network traffic when designing the distributed program.

DP additionally affords programmers the ability to create many different versions of a distributed program for various hardware setups. Those skilled in the art of software development will recognize that developing an application that can run on any type of hardware setup is difficult. Hardware configurations typically limit the functionality of a program. However, because DP allows for the flexible creation of programs through the use of tables, columns, and rows, it is easy to define and manage different versions of the distributed program.

Finally, because DP allows a distributed program to be changed at run-time, development time may be minimized. Typical code development requires changing code, recompiling code, and restarting every program on every computer. Typically, applications that rely on complex graphics may have long initialization times in order to load large numbers of graphical models. Each time a bug is identified, or an enhancement needs to be implemented, the distributed program must be restarted which may consume a lot of time. It is possible to use DP to fix bugs and add functionality without restarting the programs. These changes require the DP programmer to: (1) write a script to change the currently running system; and (2) change the initialization scripts for the next program initialization. In DP, these two tasks are typically the same. The functions that change tables, columns, and rows in the run-time system are identical to the ones used in the initialization scripts. This makes it simple to change the system at run-time.

The foregoing merely illustrates the principles of the disclosed subject matter. Various modifications and alterations to the described embodiments will be apparent to those skilled in the art in view of the teachings herein. It will thus be appreciated that those skilled in the art will be able to devise numerous techniques which, although not explicitly described herein, embody the principles of the disclosed subject matter and are thus within its spirit and scope.

For example, one skilled in the art would, in view of the teachings herein, be able to apply this general programming technique to create non-distributed programs to be used on a single computer. By manipulating the columns and/or rows of a program running on a single computer 110, 112, functions and variables can be added or removed from a currently running program. This makes it easy to change parts of an existing program that are typically difficult to change, specifically modifying control flow statements, such as loops and conditional blocks of code. The tabular structure makes it easier to manipulate run-time programs from other existing methods, such as scripting, where entire functions and blocks of code need to be replaced.

Also, features of different drawings and/or embodiments can be combined and/or rearranged.

The invention claimed is:

1. A method, comprising:
generating, by a first computer, a first tabular storage structure that includes data and code, wherein the code is defined by a column of the first tabular storage structure; and
executing, by the first computer, a program using the first tabular storage structure, wherein the code of the first tabular storage structure governs an operation of the program.

2. The method of claim 1, wherein the data includes at least primitive variables or dynamic data structures, and the code includes at least functions and arguments to the functions.

3. The method of claim 2, further comprising:
generating, by the first computer, a second tabular storage structure that includes data, wherein the execution of the program by the first computer also uses the data of the second tabular storage structure.

4. The method of claim 2, wherein a second computer includes a third tabular storage structure that includes the same data that is included in the first tabular storage structure of the first computer.

5. The method of claim 4, wherein the program is a distributed program.

6. The method of claim 4, further comprising:
generating, by the first computer, a set of system tabular storage structures that define a manner of replicating at least part of the first tabular storage structure to the second computer.

7. The method of claim 4, further comprising:
using, by the first computer, a function that changes the third tabular storage structure of the second computer, a column of the third tabular storage structure of the second computer, or a row of the third tabular storage structure of the second computer.

8. The method of claim 4, wherein the first computer maintains a master record for a first row in the first and third tabular storage structures and the second computer maintains a master record for a second row in the first and third tabular storage structures.

9. The method of claim 2, further comprising:
using, by the first computer, a function that changes the first tabular storage structure, a column of the first tabular storage structure, or a row of the first tabular storage structure.

10. The method of claim 2, wherein the code of the first tabular storage structure includes a graphical function that is executed every time a frame is rendered by the first computer or a function that is executed when data in the first tabular storage structure is changed.

11. The method of claim 2, wherein the code of the first tabular storage structure includes a function that modifies a control flow statement, wherein the control flow statement is a loop or a conditional block of code.

12. The method of claim 2, further comprising:
generating, by the first computer, a unified function that
provides access and controls system functions,
user-defined functions, and
memory allocation/de-allocation functions.

13. The method of claim 12, wherein the system functions account for fundamental functions, the user-defined functions temporarily allocate memory to recursively call the unified function as a sequence of commands that share arguments, and the memory allocation/de-allocation functions create or remove a row in a table.

14. A first computer, comprising:
a processor; and
a memory,
wherein the processor is configured to
generate a first tabular storage structure that includes data and code, wherein the code is defined by a column of the first tabular storage structure; and
execute a program using the first tabular storage structure, wherein the code of the first tabular storage structure governs an operation of the program.

15. The first computer of claim 14, wherein the data includes at least primitive variables or dynamic data structures, and the code includes at least functions and arguments to the functions.

16. The first computer of claim 15, wherein the processor is further configured to:
generate a second tabular storage structure that includes data, wherein the execution of the program by the first computer also uses the data of the second tabular storage structure.

17. The first computer of claim 15, wherein the first computer is connected to a second computer via a network, and the second computer includes a third tabular storage structure that includes the same data that is included in the first tabular storage structure of the first computer.

18. The first computer of claim 17, wherein the program is a distributed program.

19. The first computer of claim 17, wherein the processor is further configured to:
generate a set of system tabular storage structures that define a manner of replicating at least part of the first tabular storage structure to the second computer.

20. The first computer of claim 17, wherein the processor is further configured to:
use a function that changes the third tabular storage structure of the second computer, a column of the third tabular storage structure of the second computer, or a row of the third tabular storage structure of the second computer.

21. The first computer of claim 17, wherein the first computer maintains a master record for a first row in the first and third tabular storage structures and the second computer maintains a master record for a second row in the first and third tabular storage structures.

22. The first computer of claim 15, wherein the processor is further configured to:
use a function that changes the first tabular storage structure, a column of the first tabular storage structure, or a row of the first tabular storage structure.

23. The first computer of claim 15, wherein the code of the first tabular storage structure includes a graphical function that is executed every time a frame is rendered by the first computer or a function that is executed when data in the first tabular storage structure is changed.

24. The first computer of claim 15, wherein the code of the first tabular storage structure includes a function that modifies a control flow statement, wherein the control flow statement is a loop or a conditional block of code.

25. The first computer of claim 15, wherein the processor is further configured to:
generate a unified function that provides access and controls system functions,
user-defined functions, and
memory allocation/de-allocation functions.

26. The first computer of claim 25, wherein the system functions account for fundamental functions, the user-defined functions temporarily allocate memory to recursively call the unified function as a sequence of commands that share arguments, and the memory allocation/de-allocation functions create or remove a row in a table.

* * * * *